(12) United States Patent
Okada et al.

(10) Patent No.: US 8,574,747 B2
(45) Date of Patent: *Nov. 5, 2013

(54) CAR POWER SOURCE APPARATUS

(75) Inventors: Wataru Okada, Kobe (JP); Shinsuke Nakamura, Kobe (JP); Akinobu Wakabayashi, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 510 days.

This patent is subject to a terminal disclaimer.

(21) Appl. No.: 12/833,227

(22) Filed: Jul. 9, 2010

(65) Prior Publication Data

US 2011/0008659 A1 Jan. 13, 2011

(30) Foreign Application Priority Data

Jul. 10, 2009 (JP) ................................. 2009-164264

(51) Int. Cl.
*H01M 2/10* (2006.01)
*H01M 10/48* (2006.01)
*H01M 2/04* (2006.01)

(52) U.S. Cl.
USPC ................ 429/159; 429/90; 429/99; 429/177

(58) Field of Classification Search
None
See application file for complete search history.

(56) References Cited

U.S. PATENT DOCUMENTS 7,401,669 B2 7/2008 Fujii et al.
8,227,141 B2 * 7/2012 Yoshikawa et al. ........... 429/508
8,256,552 B2 * 9/2012 Okada .......................... 180/68.5
2010/0000816 A1 * 1/2010 Okada .......................... 180/68.5
2010/0081041 A1 * 4/2010 Okada et al. .................... 429/82

FOREIGN PATENT DOCUMENTS

| JP | 2006-35915 | | 2/2006 |
|---|---|---|---|
| JP | 2007-42345 | | 2/2007 |
| JP | 2007-42397 | | 2/2007 |
| JP | 2008-310966 | | 12/2008 |
| JP | 2009-146881 | | 7/2009 |
| WO | WO 2008/059980 | * | 5/2008 |
| WO | 2009/066661 | | 5/2009 |

* cited by examiner

*Primary Examiner* — Jonathan Crepeau
(74) *Attorney, Agent, or Firm* — Wenderoth, Lind & Ponack, L.L.P.

(57) ABSTRACT

A car power source apparatus has a battery block (2) including a plurality of connected batteries (1), a battery state detection section (3) connected to the battery block, a base-plate (4) having the battery state detection section and battery block mounted thereon, a cover-plate (5) that closes-off the top of the base-plate, and side-plates (6) that close-off open regions between the cover-plate and the base plate. The cover-plate is provided with a top cover (7) that establishes an interior battery holding region (12), and an electronic component cover (8) that establishes an interior electronic component compartment (13). The edges at ends of the cover-plate have end edge-covers (7X, 8X) that extend downward along the outer surfaces of the side-plate. The end edge-covers make the connection between the cover-plate and the side-plate water-tight.

19 Claims, 12 Drawing Sheets

CAR POWER SOURCE APPARATUS

BACKGROUND OF THE INVENTION

1. Field of the Invention

The present invention relates to a high-current power source apparatus primarily used as the power source for a motor that drives an automobile such as a hybrid car or electric vehicle (EV), and in particular to a power source apparatus that prevents the ingress of water into the case that houses the batteries.

2. Description of the Related Art

An automobile such as an electric vehicle driven by a motor or a hybrid car driven by both a electric motor and an engine has a power source apparatus with a case housing batteries installed on-board. Since the vehicle is driven by an electric motor, the power source apparatus has many batteries connected in series to increase the voltage for large output. For example, although the voltage for a standard automobile electric system battery (lead-acid storage battery) installed in most cars is almost without exception 12V, the output voltage of a power source apparatus that powers a driving motor is extremely high and typically 200V or more.

The batteries in this type of power source apparatus can be protected by making the case that houses the batteries a water-tight structure. This is necessary because water ingress into the case can corrode the batteries and internal metal components. In addition, water ingress into the case can also be the cause of leakage currents and electrical shocks.

A car power source apparatus with a case made as a water-tight structure has been developed to avoid these detrimental effects. (Refer to Japanese Laid-Open Patent Publication 2006-35915.)

As shown in FIG. 1, the power source apparatus cited in JP 2006-35915-A has base-plate 94 open regions closed-off by a top cover 97 and an electronic component cover 98, and the boundaries with the top cover 97 and the electronic component cover 98 are made water-tight with gaskets 95. However, it is difficult to reliably sandwich the gaskets 95 for this water-tight structure, and it has the drawback that long-term maintenance of a reliable water-tight configuration at the top cover 97 and electronic component cover 98 boundaries is problematic. Further, although the boundaries of the top cover and the electronic component cover of this power source apparatus can be made in a water-tight configuration, the structure has connecting regions between the base-plate and the perimeter of the top cover, and it has both ends of the base-plate closed-off by side-plates. Consequently, this configuration has the drawback that connecting regions at the side-plates, the top cover, and the electronic component cover cannot be sealed in a satisfactory water-tight configuration.

The present invention was developed with the object of correcting the drawbacks described above. Thus, it is an important object of the present invention to provide a car power source apparatus that can make the case housing the battery blocks and battery state detection section water-tight with an extremely simple structure, and can effectively prevent water ingress into the case to effectively prevent corrosion and electrical shock.

SUMMARY OF THE INVENTION

The first aspect of the car power source apparatus of the present invention is provided with battery blocks 2 having a plurality of connected batteries 1; a battery state detection section 3 connected to the battery blocks 2; a base-plate 4 that has the battery state detection section 3 and battery blocks 2 mounted on top; a cover-plate 5 that closes-off the top of the base-plate 4, establishes a battery holding region 12 that holds the battery blocks 2 between the base-plate 4 and the cover-plate 5, and establishes an electronic component compartment 13 that houses the battery state detection section 3; and side-plates 6 that close-off the open regions between the cover-plate 5 and base-plate 4 at both ends. The cover-plate 5 is provided with a top cover 7 that establishes the battery holding region 12 inside, and an electronic component cover 8 that establishes the electronic component compartment 13 inside. The electronic component cover 8 is layered on, and connected to the top cover 7 of the cover-plate 5. Stud bolts 17 are fixed to top cover 7, which is the lower layer, and through-holes 8b are provided in the upper layer electronic component cover 8. The stud bolts 17 are passed through the through-holes 8b and nuts 18 are threaded onto the stud bolts 17 to attach the electronic component cover 8 on top of the top cover 7. In addition, a gasket 19 is interposed in the region where the electronic component cover 8 and top cover 7 overlap at a location on the battery state detection section 3 compartment-side of the stud bolts 17, and this achieves a water-tight structure at the connecting region between the top cover 7 and electronic component cover 8.

This power source apparatus can also effectively prevent water ingress into the case and effectively prevent corrosion and electrical shock by making the case, which houses the battery blocks and battery state detection section, water-tight with an extremely simple structure. In particular, this power source apparatus configuration attaches the electronic component cover to stud bolts fixed to the top cover, and has a gasket disposed on the compartment-side of the stud bolts. Consequently, this structure has the characteristic that the overlapping region of the top cover and electronic component cover can reliably be made water-tight while implementing a configuration that allows removal of the electronic component cover from the top cover.

In the car power source apparatus of the present invention, a cavity 36 to hold the gasket 19 can be provided in either the top cover 7 or the electronic component cover 8, and the gasket 19 can be disposed in that cavity 36. In this power source apparatus, the electronic component cover can be attached to the top cover with the electronic component cover and top cover in surface contact and the nuts threaded tightly onto the stud bolts while insuring that the overlapping region is water-tight. This is because the gasket is disposed in the cavity, and therefore the electronic component cover can be attached to the top cover without completely squashing the gasket.

In the car power source apparatus of the present invention, both sides of the top cover 7 and the base-plate 4 can be attached to form the battery holding region 12 inside, and the electronic component cover 8 can be attached on both sides to the top cover 7 and the base-plate 4 to form the electronic component compartment 13 inside.

The second aspect of the car power source apparatus of the present invention is provided with battery blocks 2 having a plurality of connected batteries 1; a battery state detection section 3 connected to the battery blocks 2; a base-plate 4 that has the battery state detection section 3 and battery blocks 2 mounted on top; a cover-plate 5 that closes-off the top of the base-plate 4, establishes a battery holding region 12 that holds the battery blocks 2 between the base-plate 4 and the cover-plate 5, and establishes an electronic component compartment 13 that houses the battery state detection section 3; and side-plates 6 that close-off the open regions between the cover-plate 5 and base-plate 4 at both ends. The cover-plate 5 is provided with a top cover 7 that establishes the battery holding region 12 inside, and an electronic component cover 8 that establishes the electronic component compartment 13 inside. The sides of the base-plate 4 and the sides of the cover-plate 5 are provided with connecting regions 4a, 7a, 8a that connect in a stacked (flanged) manner. Gaskets 29 are interposed in the connecting regions 4a, 7a, 8a to connect both sides of the base-plate 4 to both sides of the cover-plate 5. The gaskets 29 have projections 29a that extend in the lengthwise direction, and those projections 29a are sandwiched between the base-plate 4 and the top cover 7 and the electronic component cover 8 to make water-tight connections.

This power source apparatus can also effectively prevent water ingress into the case and effectively prevent corrosion and electrical shock by making the case, which houses the battery blocks and battery state detection section, water-tight with an extremely simple structure. In particular, this power source apparatus stacks the sides of the base-plate together with the both sides of the top cover and electronic component cover with intervening gaskets. Further, since projections are provided extending in the lengthwise direction on the gaskets and the stacked connecting regions are joined sandwiching the gaskets, the base-plate can be connected to the top cover and electronic component cover in a reliable water-tight configuration.

In the car power source apparatus of the present invention, the electronic component cover 8 can be layered on, and connected to the top cover 7 of the cover-plate 5. Stud bolts 17 can be fixed to top cover 7, which is the lower layer, and through-holes 8b can be provided in the upper layer electronic component cover 8. The stud bolts 17 can be passed through the through-holes 8b and nuts 18 threaded onto the stud bolts 17 to attach the electronic component cover 8 on top of the top cover 7. In addition, a gasket 19 can be interposed in the region where the electronic component cover 8 and top cover 7 overlap at a location on the battery state detection section 3 compartment-side of the stud bolts 17, and this enables a water-tight structure at the connecting region between the top cover 7 and electronic component cover 8. This power source apparatus can reliably attach the electronic component cover over the top cover in water-tight manner in addition to attaching the top cover and electronic component cover to both sides of the base-plate in an effective water-tight configuration.

In the car power source apparatus of the present invention, both sides of the top cover 7 and the base-plate 4 can be attached to form the battery holding region 12 inside, and the electronic component cover 8 can be attached on both sides to the top cover 7 and the base-plate 4 to form the electronic component compartment 13 inside.

The third aspect of the car power source apparatus of the present invention is provided with battery blocks 2 having a plurality of connected batteries 1; a battery state detection section 3 connected to the battery blocks 2; a base-plate 4 that has the battery state detection section 3 and battery blocks 2 mounted on top; a cover-plate 5 that closes-off the top of the base-plate 4, establishes a battery holding region 12 that holds the battery blocks 2 between the base-plate 4 and the cover-plate 5, and establishes an electronic component compartment 13 that houses the battery state detection section 3; and side-plates 6 that close-off the open regions between the cover-plate 5 and base-plate 4 at both ends. The cover-plate 5 is provided with a top cover 7 that establishes the battery holding region 12 inside, and an electronic component cover 8 that establishes the electronic component compartment 13 inside. The battery blocks 2 have an attachment section 9 for attaching the top cover 7. The top cover 7 is attached to the battery block 2 attachment section 9 via set screws 30 that insert from the outside of the top cover 7, pass through the top cover 7, and screw into the battery block 2 attachment section 9. The battery block 2 attachment section 9 has screw-holes 33 with closed-off bottoms for screwing in the set screws 30, and has attachment surfaces 9A that contact the inside surface of the top cover 7. The attachment surfaces 9A have gaskets 35 disposed around the outsides of the screw-hole perimeters, and the gaskets 35 are sandwiched between the top cover 7 and the attachment surfaces 9A to attach the top cover 7 to the battery blocks 2 in a water-tight configuration.

This power source apparatus can also effectively prevent water ingress into the case and effectively prevent corrosion and electrical shock by making the case, which houses the battery blocks and battery state detection section, water-tight with an extremely simple structure. Further, the top cover attaches to the battery blocks in a reliable water-tight configuration that allows the top cover to be detached from the battery blocks. This is because the top cover is attached to the battery block attachment section via set screws, and the battery block attachment section is provided with attachment surfaces that contact the inside surface of the top cover. The attachment surfaces are provided with screw-holes, which have bottoms that are closed-off, and ring-shaped gaskets are disposed around the outsides of the screw-holes. Further, the gaskets are sandwiched between the top cover and the attachment surfaces to attach the top cover to the battery blocks in a water-tight structure.

In the car power source apparatus of the present invention, the battery blocks 2 have a plurality of batteries 1 stacked and held between endplates 22, and the battery block 2 attachment section 9 can be an attachment bar 31 that extends lengthwise in the battery 1 stacking direction and is attached to the endplates 22 that sandwich the batteries 1. The attachment bar 31 has connecting bosses 32 that project towards the inside surface of the top cover 7, and screw-holes 33 are established inside those connecting bosses 32. In this power source apparatus, an attachment bar, which is a separate part from the battery blocks, is provided as the attachment section, and the top cover is attached to this attachment bar. Consequently, the attachment bar can be formed in a shape that is optimal for top cover attachment, and the top cover can be reliably attached to the battery blocks.

In the car power source apparatus of the present invention, battery blocks 2 can be disposed in two rows on top of the base-plate 4. A cooling duct 20 can be established between the two rows of battery blocks 2, and the top of the cooling duct 20 can be closed-off by the attachment section 9 attachment bar 31. In this power source apparatus, the attachment bar, which is the battery block attachment section, is used for the dual purpose of closing-off the top of the cooling duct. Consequently, the top cover can be reliably attached to the two rows of battery blocks without having to provide special-purpose parts to close-off the upper surface of the cooling duct.

In the car power source apparatus of the present invention, both sides of the top cover 7 and the base-plate 4 can be attached to form the battery holding region 12 inside, and the electronic component cover 8 can be attached on both sides to the top cover 7 and the base-plate 4 to form the electronic component compartment 13 inside.

The above and further objects of the present invention as well as the features thereof will become more apparent from the following detailed description to be made in conjunction with the accompanying drawings.

DETAILED DESCRIPTION OF THE EMBODIMENT(S)

Figure 1:
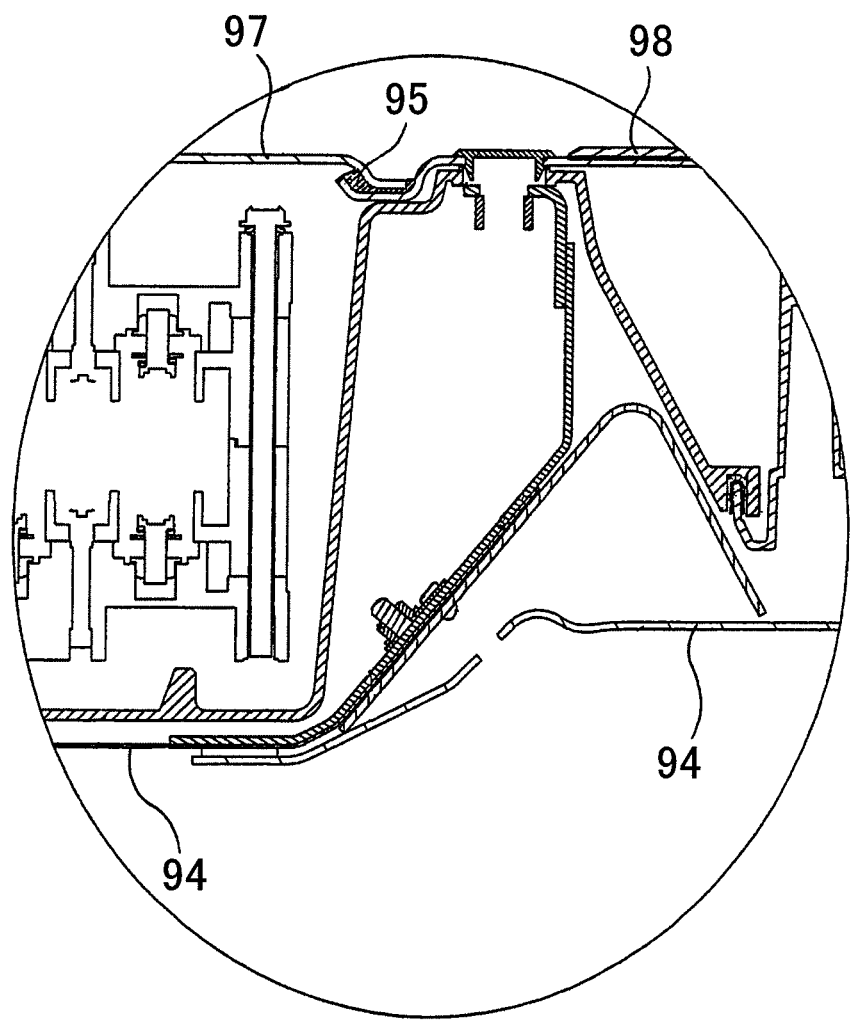
FIG. 1 is an enlarged cross-sectional view of a prior art car power source apparatus.
Figure 2:
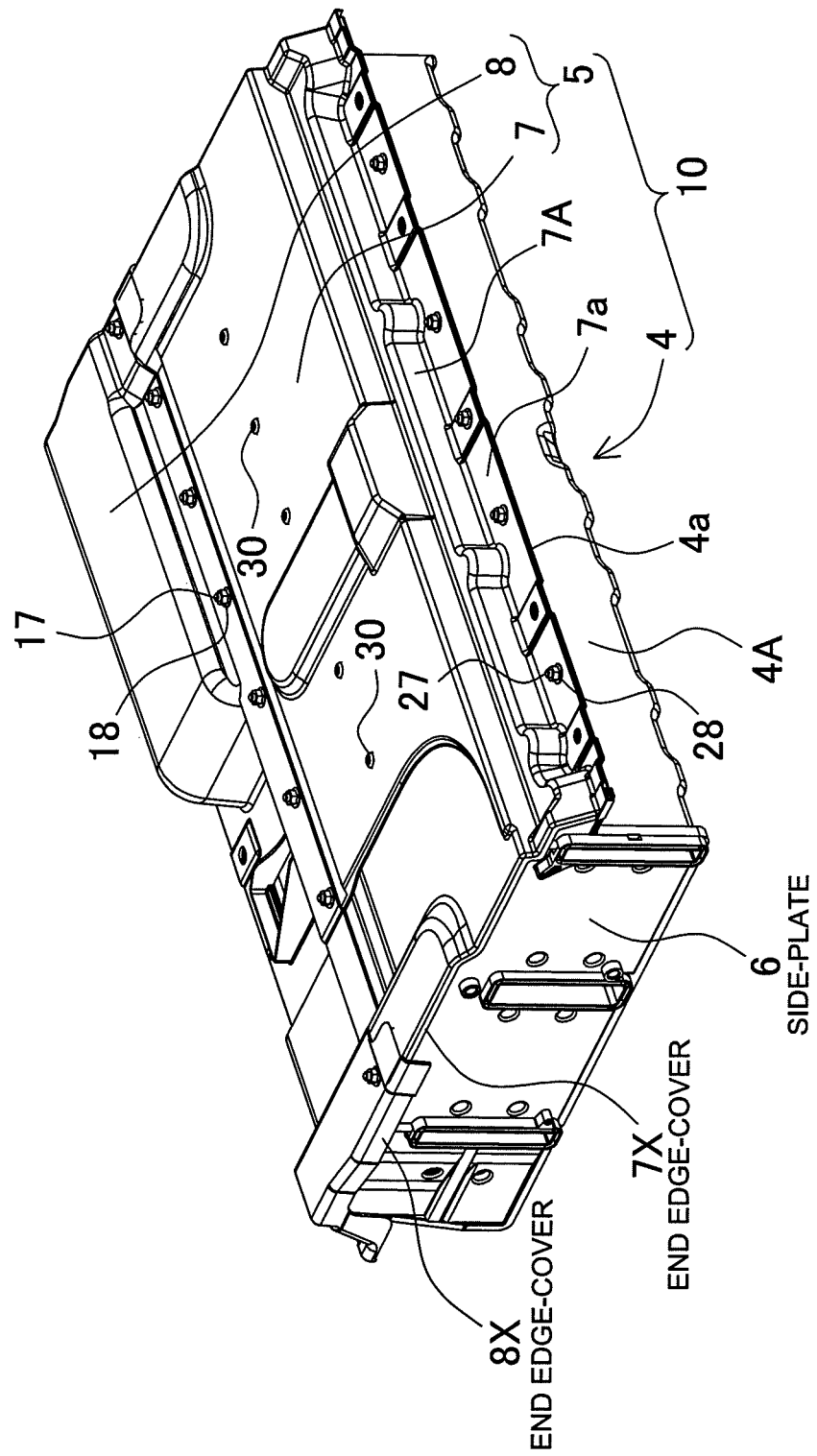
FIG. 2 is a perspective view of a car power source apparatus in accordance with an embodiment of the present invention.
Figure 3:
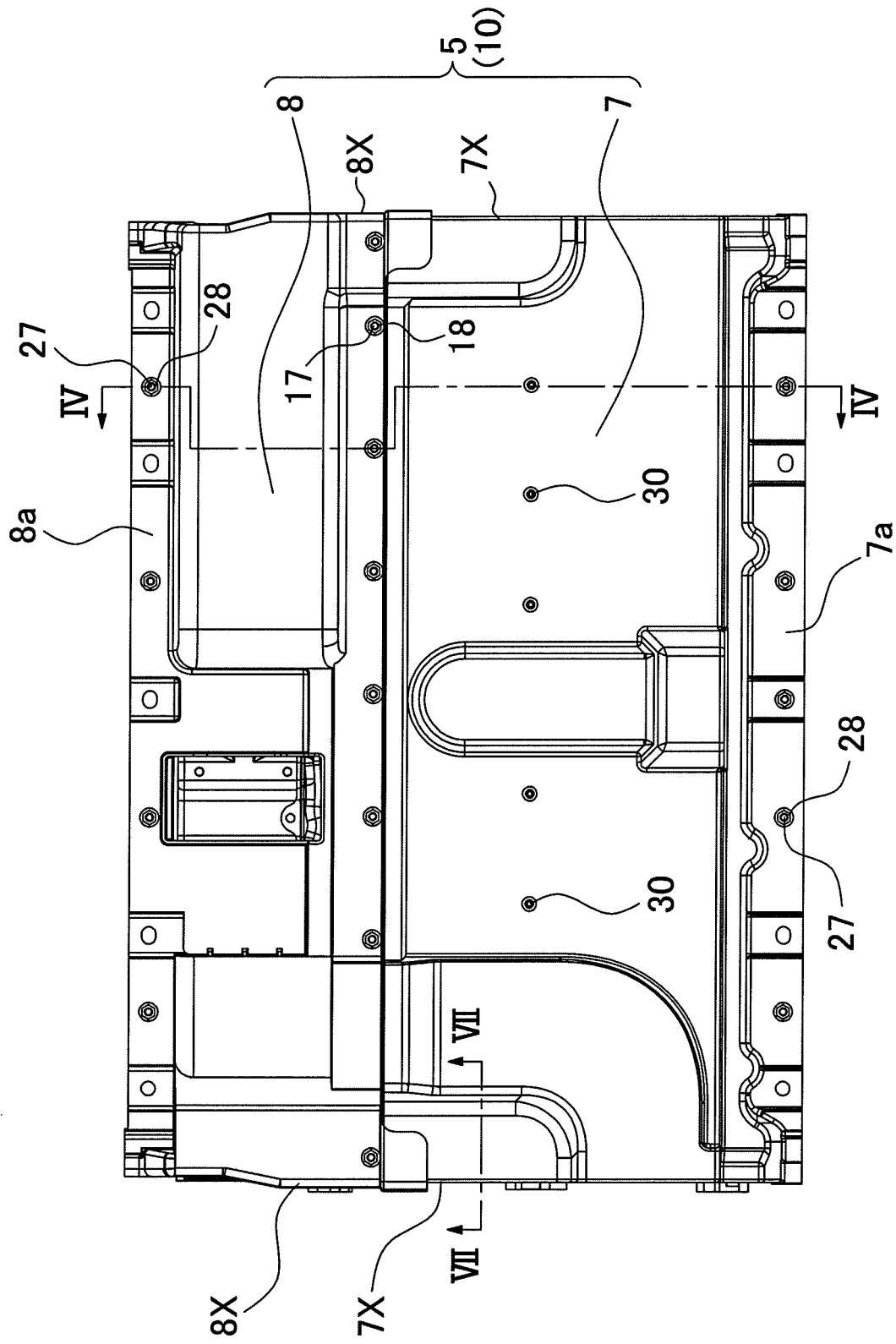
FIG. 3 is a plan view of the car power source apparatus shown in FIG. 2.

The following describes embodiments of the present invention based on the figures. However, the following embodiments are merely specific examples of a car power source apparatus representative of the technology associated with the present invention, and the car power source apparatus of the present invention is not limited to the embodiments described below.

The car power source apparatus shown in FIGS. 2-6 is provided with battery blocks 2 having a plurality of connected batteries 1; a battery state detection section 3 connected to the battery blocks 2; a base-plate 4 that has the battery state detection section 3 and battery blocks 2 mounted on top; a cover-plate 5 that closes-off the top of the base-plate 4, establishes a battery holding region 12 that holds the battery blocks 2 between the base-plate 4 and the cover-plate 5, and establishes an electronic component compartment 13 that houses the battery state detection section 3; and side-plates 6 that close-off the open regions between the cover-plate 5 and base-plate 4 at both ends. The cover-plate 5 shown in the figures is provided with a top cover 7 that establishes the battery holding region 12 inside, and an electronic component cover 8 that establishes the electronic component compartment 13 inside.

(Battery Block 2)

Each battery block 2 has a plurality of batteries 1 stacked with intervening separators 21 and sandwiched from both ends by endplates 22. The multiple batteries 1 in a battery block 2 are disposed next to each other, and the electrode terminals 14 of adjacent batteries 1 are connected together. The electrode terminals 14 of adjacent batteries 1 are electrically connected via bus-bars (not illustrated).

The batteries 1 are rectangular batteries. Each rectangular battery has a rectangular external case with an open region that is closed-off in an air-tight manner by a sealing plate. Compared to circular cylindrical batteries, rectangular batteries can be efficiently arranged and a high energy density (per unit volume) can be achieved. This is particularly desirable for automotive applications where there is a high demand for space reduction. Rechargeable batteries such as lithium ion rechargeable rectangular batteries can be used as these types of batteries 1. In addition, rechargeable batteries such as nickel-based batteries can also be used. The electrode terminals 14 of the batteries are connected in series or parallel.

Each battery 1 has an external case, which has a closed bottom and is made from a metal such as aluminum. The top of the external case is closed-off by a sealing plate also made from a metal such as aluminum. The perimeter of the sealing plate is laser welded to attach the sealing plate to the open end of the external case in an air-tight (hermetically sealed) manner. The sealing plate has positive and negative electrode terminals 14 mounted at opposite ends, and the electrode terminals 14 of adjacent batteries 1 are joined to connect the batteries 1 in series. The electrode terminals 14 are covered by terminal covers 23.

Figure 4:
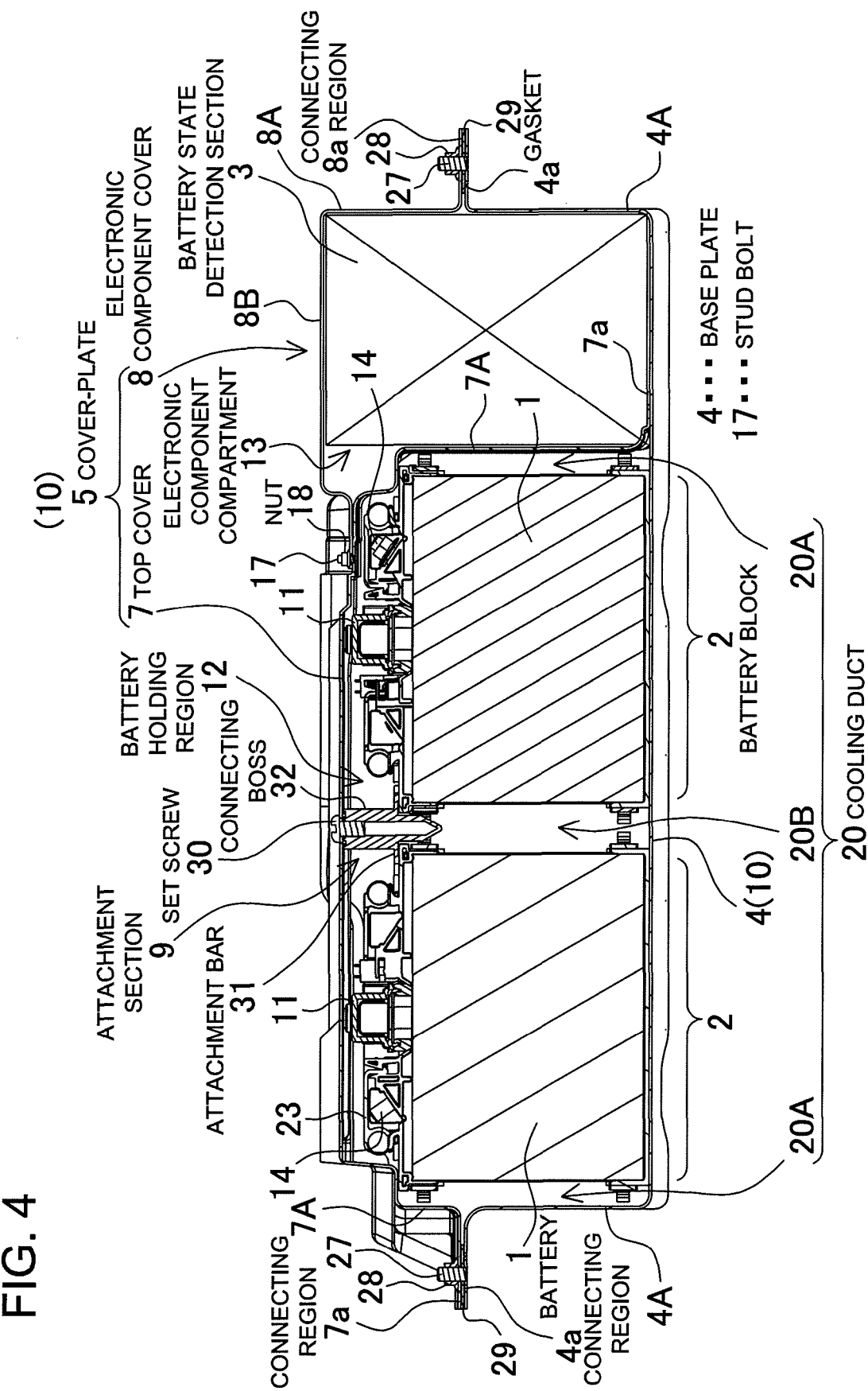
FIG. 4 is a cross-section taken along line IV-IV of the car power source apparatus shown in FIG. 3.
Figure 5:
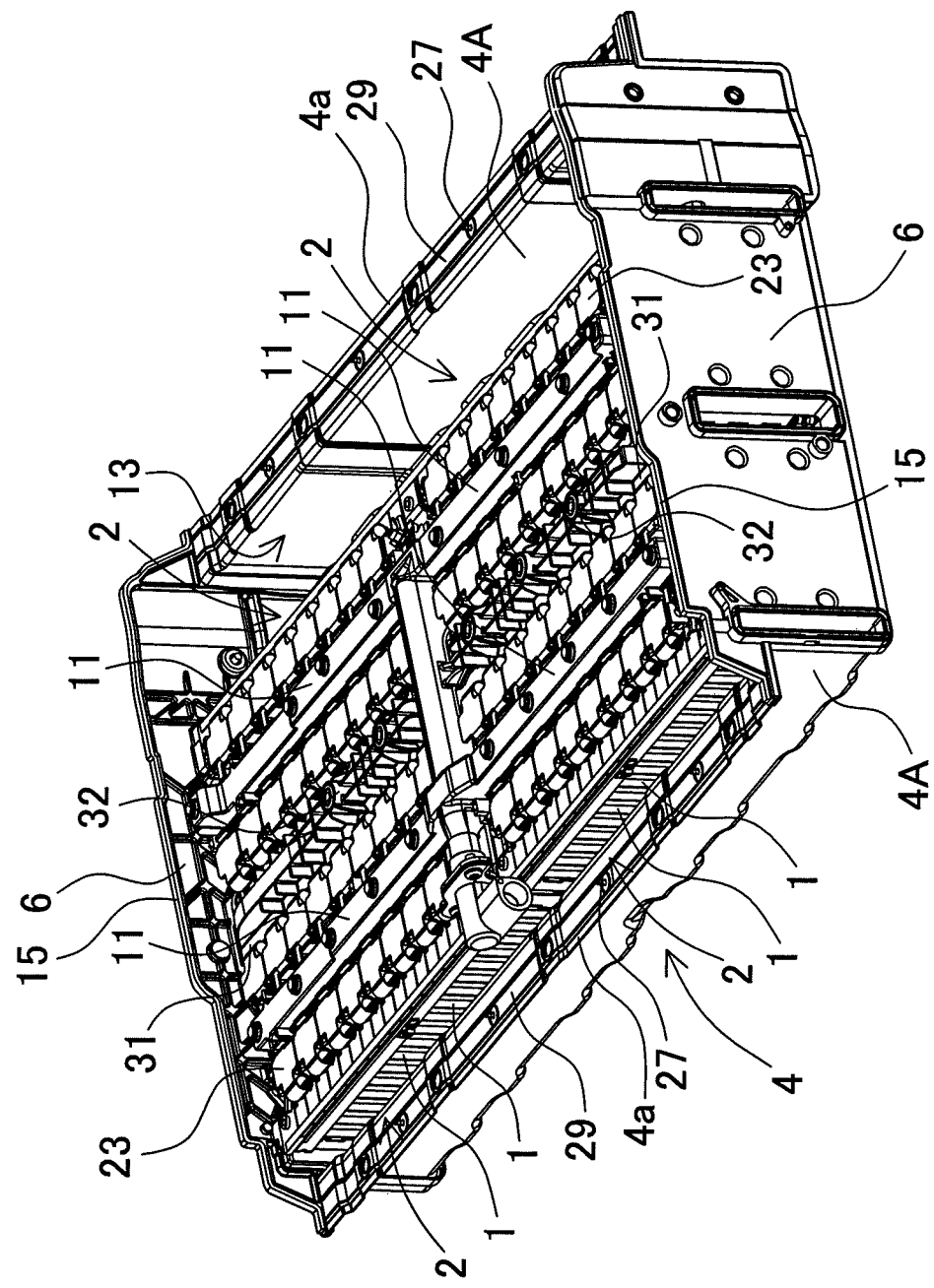
FIG. 5 is a perspective view showing the internal structure of the car power source apparatus shown in FIG. 2.
Figure 6:
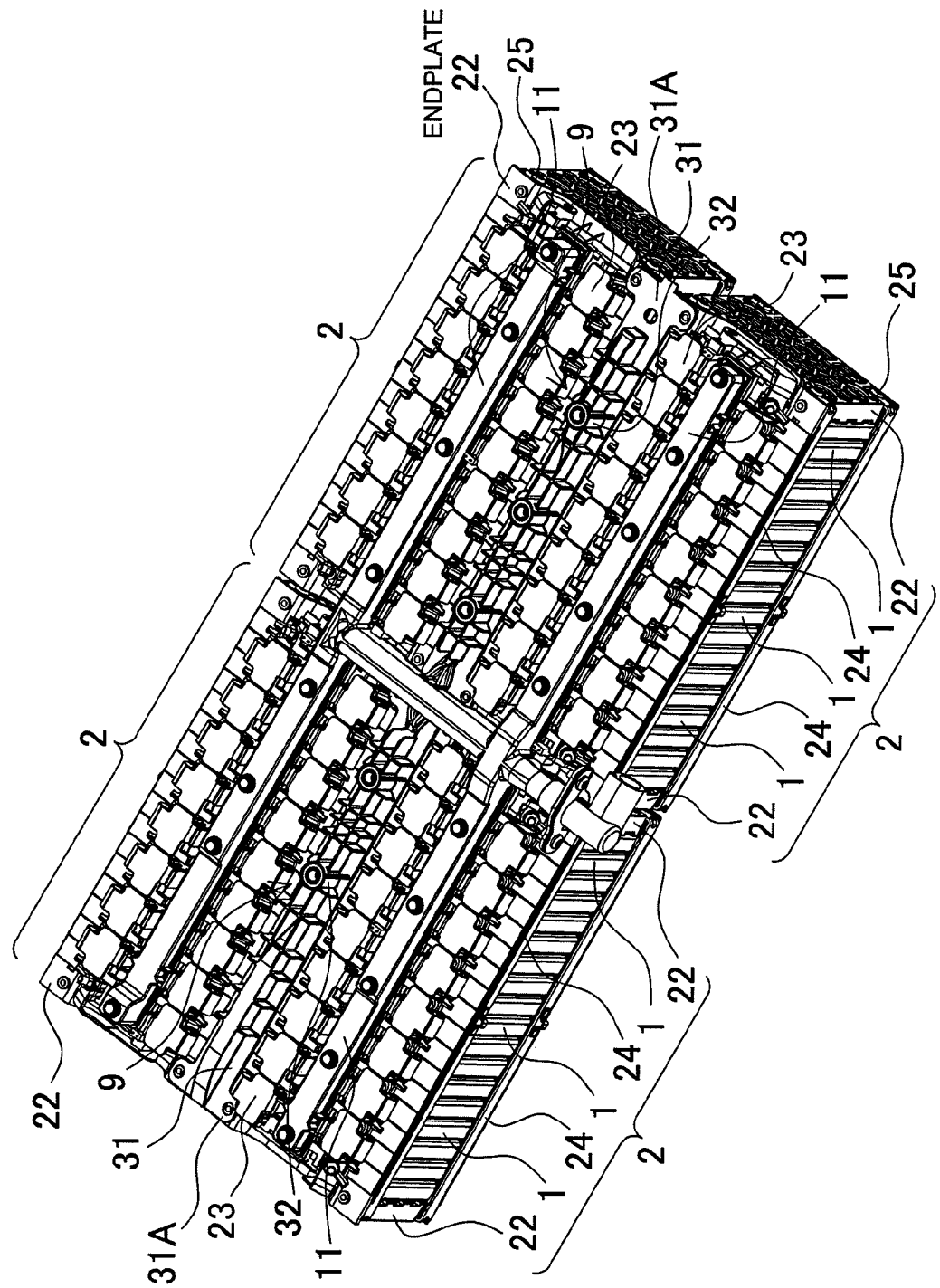
FIG. 6 is a perspective view showing the battery blocks of the car power source apparatus shown in FIG. 5.

The terminal covers 23 cover the exteriors of the electrode terminals 14, and insulate the electrode terminals 14 and exposed electrical connection regions. The terminal covers 23 of FIGS. 4-6 are connected on the upper surfaces on both sides of the separators 21. Since these terminal covers 23 cover electrode terminals 14 that protrude from the upper surfaces of the batteries 1, the terminal covers 23 also protrude from the upper surfaces of the battery blocks 2.

Further, the power source apparatus of FIGS. 4-6 has gas exhaust ducts 11 disposed on the upper surfaces of the battery blocks 2 to exhaust gas discharged from battery safety valves (not illustrated) to the outside. Each gas exhaust duct 11 is disposed at the center of a battery block 2 and extends in the lengthwise direction. Each gas exhaust duct 11 has openings in its bottom surface and is attached to the top of a battery block with those openings oriented opposite the battery safety valves. Each gas exhaust duct 11 is attached to a battery block 2 in a manner that disposes the safety valve openings on the upper surfaces of the batteries inside the gas exhaust duct 11. Each battery 1 is provided with a safety valve opening at the center of the sealing plate on its upper surface. The safety valve opens if battery 1 internal pressure rises and exceeds a set pressure. If the safety valve opens, gas and electrolyte is discharged from inside the battery 1. This gas and electrolyte is discharged into the gas exhaust duct 11, passed through the gas exhaust duct 11, and exhausted outside the power source apparatus.

Figure 7:
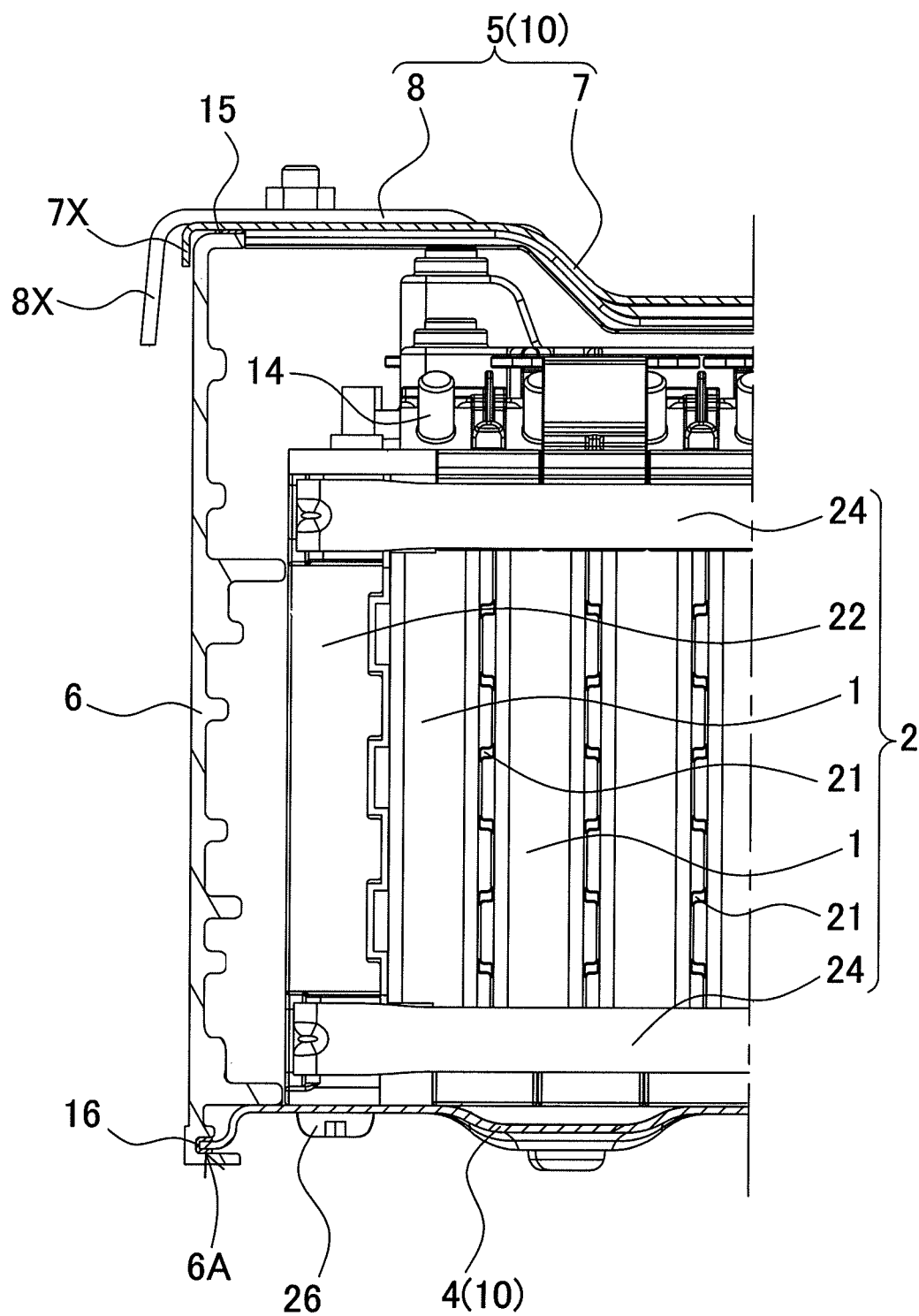
FIG. 7 is a cross-section taken along line VII-VII of the car power source apparatus shown in FIG. 3.

As shown in the cross-section of FIG. 7, a battery block 2 has separators 21 sandwiched between adjacent batteries 1. The separators 21 have rectangular shapes that are equal in size to the battery 1 outline, and the separators 21 are sandwiched between adjacent batteries 1 to insulate the batteries 1. The separators 21 are made from insulating material with superior heat resistance and thermal insulating properties, and preferably are molded from light-weight, inexpensive resins. For example, synthetic resins with low thermal conductivity (preferably less than or equal to 0.5 W/m) such as polypropylene and polyurethane can be used. Consequently, batteries 1 are protected by the separators 21, and adjacent batteries are insulated electrically and thermally. In addition, the separators 21 have hills and valleys established by alternating projections and grooves, and by passing a cooling medium through the grooves, the batteries 1 are cooled from the sides.

A battery block 2 is a stack of alternating batteries 1 and separators 21 that is held together by a pair of endplates 22 that sandwich the stack from both ends. The endplates 22 are made by molding them entirely from plastic, are made by insertion molding metal in the plastic, or are made of a material such as aluminum. The endplates of FIG. 6 are formed with an outline equivalent to that of the batteries 1 and with a size that covers batteries 1 exposed at both ends of a battery block 2. A pair of endplates 22 is joined together by fastening components 24 to hold the stacked batteries 1 and intervening separators 21 between the endplates 22. Screw-holes (not illustrated) are provided at the top and bottom of both sides of each endplate 22 to attach the fastening components 24. Set screws 25 are inserted through through-holes in the ends of the fastening components 24 and screwed into the screw-holes to connect a pair of endplates and form a battery block 2. (battery state detection section 3)

The battery state detection section 3 is connected to the batteries 1 and detects battery state parameters such as battery 1 voltage, current, and remaining capacity to control battery 1 charging and discharging. The battery state detection section 3 detects battery 1 voltage, and if the battery 1 voltage during charging exceeds a maximum voltage, charging current is limited or cut-off to prevent over-charging. If the battery 1 voltage of a discharging battery 1 drops below a minimum voltage, discharging current is limited or cut-off to prevent over-discharging. Further, if the remaining capacity of a battery 1 being charged exceeds a preset maximum value, charging current is limited or cut-off to prevent over-charging and protect the battery 1. If the remaining capacity drops below a minimum value, discharging current is limited or cut-off to prevent over-discharging and protect the battery 1. Further, the battery state detection section 3 detects battery 1 temperature and limits or cuts-off charging or discharging current to protect the battery 1 if battery 1 temperature exceeds a preset maximum temperature or drops below a minimum temperature. Still further, the battery state detection section 3 detects battery 1 current and cuts-off current to protect the batteries 1 if excessive current flows. The battery state detection section 3 has electronic components mounted on circuit boards, detects the condition of the batteries 1, and controls battery 1 charging and discharging.

(Base-Plate 4, Cover-Plate 5, and Side-Plates 6)

In the power source apparatus of FIGS. 2-5, the cover-plate 5 is attached on top of the base-plate 4 to form an external case 10 that establishes the battery holding region 12 to hold the battery blocks 2 and the electronic component compartment 13 to hold the battery state detection section 3 electronic components. The cover-plate 5 is made up of the top cover 7 and the electronic component cover 8. The top cover 7 is attached to the base-plate 4 and establishes the battery holding region 12 inside the external case 10. The electronic component cover 8 is attached to the base-plate 4 and establishes the electronic component compartment 13. In addition, the external case 10 has the cover-plate 5 attached to the base-plate 4 with side-plates 6 closing-off the open regions at both ends to establish the battery holding region 12 and electronic component compartment 13 within a water-tight structure.

As shown in FIG. 7, the top cover 7 and electronic component cover 8 of the cover-plate 5 are provided with end edge-covers 7X, 8X that extend at both ends over the tops of the side-plates 6 and down along the outer surfaces of the side-plates 6. These end edge-covers 7X, 8X make the regions between the top cover 7 and electronic component cover 8 of the cover-plate 5 and the side-plates 6 water-tight structures. In particular, water that falls on the top of the cover-plate 5 is guided by the end edge-covers 7X, 8X to flow down the outsides of the side-plates 6 preventing water ingress inside the external case 10.

The base-plate 4, top cover 7, and electronic component cover 8 are metal plates with a strength that can support the weight of the battery blocks 2. The base-plate 4 and top cover 7 are metal plates formed by metal press processing. The base-plate 4 and top cover 7 are iron or iron alloy (steel) plates with metal-plated or coated surfaces. However, the base-plate and top cover can also be made from any metal plate such as aluminum or aluminum alloys. The base-plate 4 and top cover 7 are made from metal plates with the same thickness, or the base-plate 4 is made from thicker metal plate than the top cover 7. The electronic component cover 8 is made of die-cast aluminum. Since die-cast aluminum can be formed in complex shapes, the electronic component cover 8 has the characteristic that it can be formed in the most suitable shape. In addition, heat from electronic components in the battery state detection section 3 can be effectively dissipated due to the superior heat dissipating properties of aluminum. However, the electronic component cover can also be made from iron, iron alloy (steel), aluminum, or aluminum alloy plate that is metal press processed.

The base-plate 4 and top cover 7 metal plates are press-formed into trough-shapes, and the electronic component cover 8 is formed in an L-shape. Side-wall sections 4A, 7A are provided on both sides of the base-plate 4 and top cover 7, and one side-wall section 8A is provided on a side of the electronic component cover 8. The power source apparatus of FIG. 4 has a base-plate 4 lateral width that is wider than the top cover 7. The electronic component compartment 13 that houses the battery state detection section 3 is established on one side (the right side in FIG. 4) between the top cover 7 side-wall section 7A and the base-plate 4 side-wall section 4A, and the electronic component cover 8 closes-off the top of that electronic component compartment 13. The base-plate 4 is made wider than the top cover 7 by an amount equal to the lateral width of the electronic component compartment 13. Specifically, the lateral width of the base-plate 4 is equal to the lateral width of the top cover 7 plus the lateral width of the electronic component compartment 13.

The base-plate 4 side-wall section 4A on the opposite side (the left side in FIG. 4) is connected to the top cover 7 side-wall section 7A. The top cover 7 side-wall section 7A on the right side is attached to the floor of the base-plate 4 and separates the electronic component compartment 13 from the battery holding region 12 that holds the battery blocks 2. The right side-wall section 7A of the top cover 7 that attaches to the floor of the base-plate 4 is made taller than the left side-wall section 7A to allow attachment of its bottom end to the floor of the base-plate 4. The end edges of the base-plate 4 and top cover 7 that connect together are provided with connecting regions 4a, 7a that bend outward with a given width. The connecting regions 4a, 7a are fastened together in a stacked configuration to join the base-plate 4 and top cover 7 in a water-tight structure.

In the power source apparatus of FIG. 4, the base-plate 4 is provided with side-wall sections 4A having almost the same height on both sides. In FIG. 4, the base-plate 4 side-wall section 4A on the left side is connected to the top cover 7 side-wall section 7A on the left side. The base-plate 4 side-wall section 4A on the right side is not connected to the top cover 7 side-wall section 7A, but rather is connected to the side-wall section 8A of the electronic component cover 8, which is connected to the top cover 7. As mentioned previously, the top cover 7 is provided with side-wall sections 7A on both sides. In the figure, the side-wall section 7A on the right side of the top cover 7 is taller than that on the left side, the shorter side-wall section 7A is connected to the base-plate 4 side-wall section 4A on the left side, and the taller side-wall section 7A on the right side is attached to the floor of the base-plate 4.

The electronic component cover 8 is layered on, and attached on top of one side of the upper surface of the top cover 7. The electronic component cover 8 is metal plate formed in an L-shape with a side-wall section 8A provided on one side of an upper plate 8B. The edge at the end of the upper plate 8A of the electronic component cover 8 is layered on, and attached to the upper end of the top cover 7. The bent connecting region 8a at the edge at the end of the side-wall section 8A of the electronic component cover 8 is fastened to the bent connecting region 4a at the edge at the upper end of the base-plate 4 side-wall section 4A on the right side. In an external case 10 with this structure, the side-wall section 7A at the right side of the top cover 7 divides the battery block 2 battery holding region 12 and the electronic component compartment 13.

Figure 8:
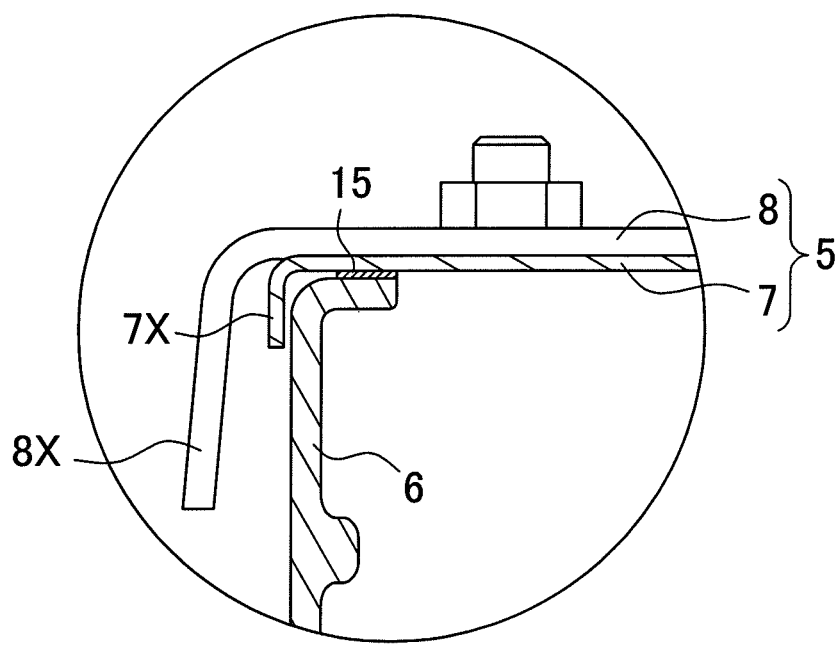
FIG. 8 is an enlarged cross-sectional view showing the water-tight structure of the cover-plate and side-plate.

The base-plate 4, cover-plate 5, and side-plates 6 are joined in a configuration that does not allow water to enter the external case 10 from the outside. As shown in FIGS. 7 and 8, to prevent the ingress of water that falls on the top of the external case 10, the top cover 7 and electronic component cover 8 of the cover-plate 5 are provided with end edge-covers 7X, 8X that extend at both ends over the tops and down along the outer sides of the side-plates 6. The end edge-covers 7X, 8X make the connections of the top cover 7 and electronic component cover 8 of the cover-plate 5 with the side-plates 6 water-tight structures. In particular, water that falls onto the cover-plate 5 is redirected down the outer sides of the side-plates 6 by the end edge-covers 7X, 8X to prevent water ingress inside the external case 10. The cover-plate 5 of FIGS. 7 and 8 has an end edge-cover 8X provided on the electronic component cover 8 that is wider than the end edge-cover 7X provided on the top cover 7. The width of the top cover 7 end edge-covers 7X is 5 mm. Since the end edge-covers 7X of the top cover 7 are narrow, the top cover 7 can be easily fabricated by press-forming metal plate. However, the width of the end edge-covers of the top cover can also be made from 3 mm to 20 mm. The width of the electronic component cover 8 end edge-covers 8X is made from 15 mm to 20 mm. A die-cast aluminum electronic component cover 8 can be easily and efficiently fabricated with wide end edge-covers 8X. Further, an electronic component cover 8 with a wide end edge-cover 8X can effectively prevent water ingress into the electronic component compartment 13.

Figure 9:
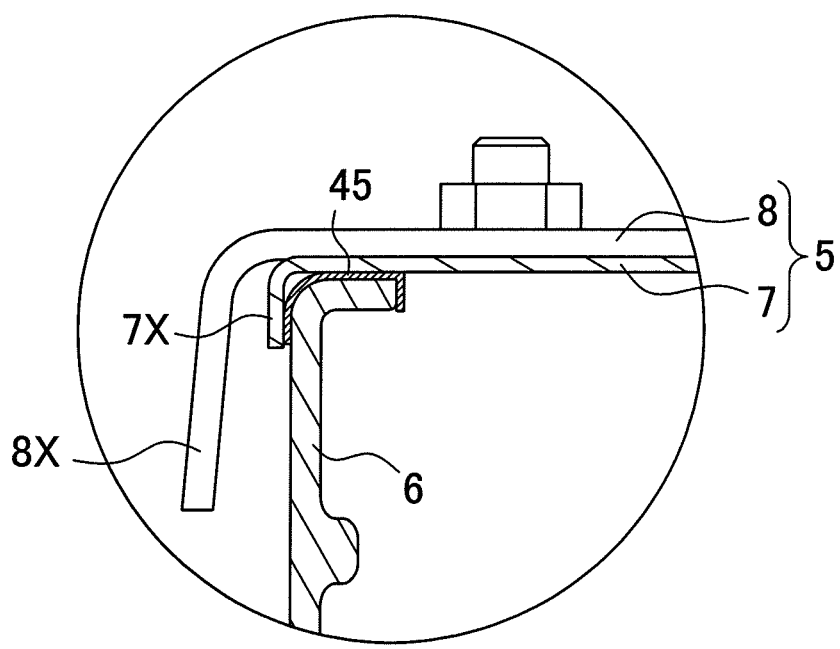
FIG. 9 is an enlarged cross-sectional view showing another example of a water-tight structure for the cover-plate and side-plate.
Figure 10:
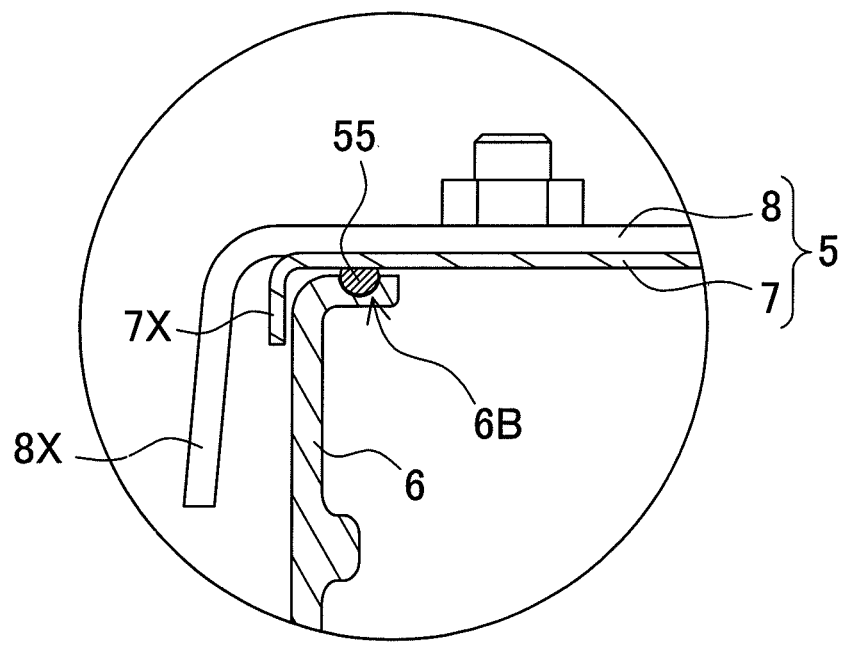
FIG. 10 is an enlarged cross-sectional view showing another example of a water-tight structure for the cover-plate and side-plate.

To make attachment of the cover-plate 5 on top of the side-plates 6 water-tight structures, gaskets 15 are sandwiched between the plates. The gaskets 15 are attached to the top surfaces of the side-plates 6 and are sandwiched between the top surfaces of the side-plates 6 and the inside surface of the cover-plate 5. This makes the connections between the cover-plate 5 and side-plates 6 water-tight structures. Although the gasket 15 in FIG. 8 is attached to the top surface of the side-plate 6, gaskets can also be configured as shown in FIGS. 9 and 10. The gasket 45 of FIG. 9 is formed in a trough shape and the upper edge of the side-plate 6 is inserted in the gasket 45 to hold it in place. The gasket 55 of FIG. 10 is inserted into a groove 6B established in the top surface of the side-plate 6 to dispose the gasket 55 in a fixed position on the side-plate 6.

Figure 11:
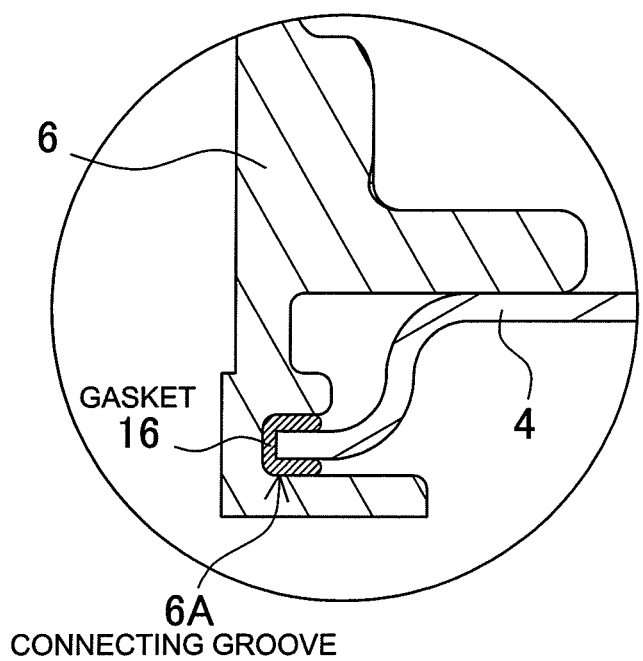
FIG. 11 is an enlarged cross-sectional view showing the water-tight structure of the base-plate and side-plate.

Further, as shown in FIGS. 7 and 11, the side-plates 6 are provided with connecting grooves 6A around their perimeters for insertion of the edges at the ends of the base-plate 4. The side-plates 6 are molded from plastic or fabricated with die-cast aluminum, and the connecting grooves 6A can be established in those side-plates 6. Gaskets 16 are disposed inside the connecting grooves 6A. The edges at the ends of the base-plate 4 are inserted into the side-plate 6 connecting grooves 6A, the gaskets 16 are sandwiched between the base-plate 4 and the side-plates 6, and the base-plate 4 and side-plates 6 are joined in a water-tight structure.

Figure 12:
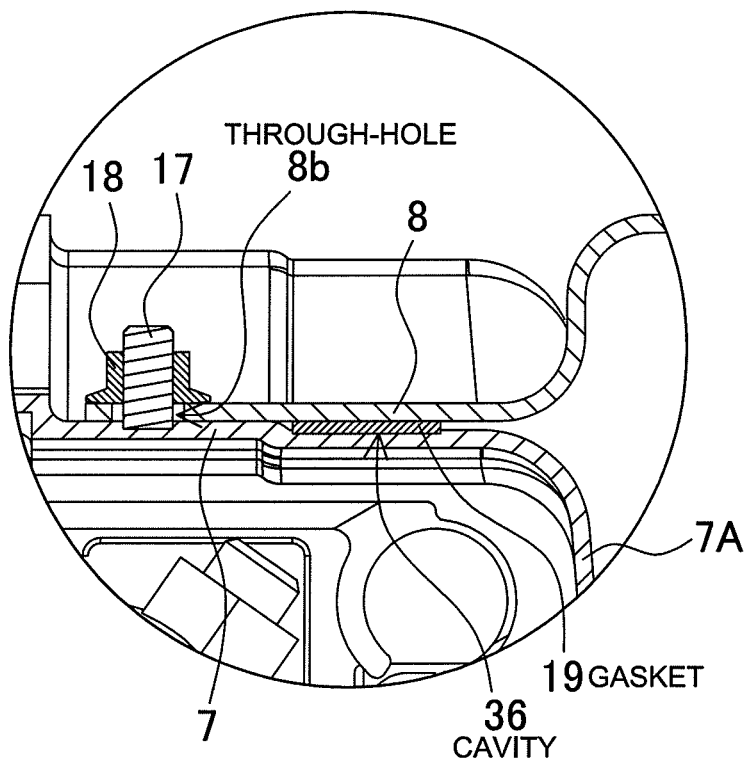
FIG. 12 is an enlarged cross-sectional view showing the water-tight structure of the top cover and electronic component cover.

Further, the cover-plate 5 of FIG. 12 has a water-tight structure for the connection between the top cover 7 and the electronic component cover 8. The electronic component cover 8 is layered on, and connected to the top cover 7 of the cover-plate 5. Stud bolts 17 are fixed to top cover 7, which is the lower layer, and through-holes 8b are provided in the upper layer electronic component cover 8 to accept the stud bolts 17. The stud bolts 17 are passed through the through-holes 8b and nuts 18 are threaded onto the stud bolts 17 to attach the electronic component cover 8 on top of the top cover 7. To make a water-tight structure between the top cover 7 and electronic component cover 8, a gasket 19 is interposed in the region where the electronic component cover 8 and top cover 7 overlap at a location on the electronic component compartment 13 side of the stud bolts 17. The top cover 7 of the figure is provided with a cavity 36 where the gasket 19 is located, and the gasket 19 is disposed in that cavity 36. However, the cavity to hold the gasket can also be provided in the electronic component cover. Although the cover-plate 5 of FIG. 12 has a gasket 19 disposed only on the electronic component compartment 13 side of the stud bolts 17, gaskets can also be disposed on both sides of the stud bolts. Specifically, gaskets can also be provided on both the electronic component compartment side and the outer side of the stud bolts to join the top cover and electronic component cover in a water-tight structure.

Figure 13:
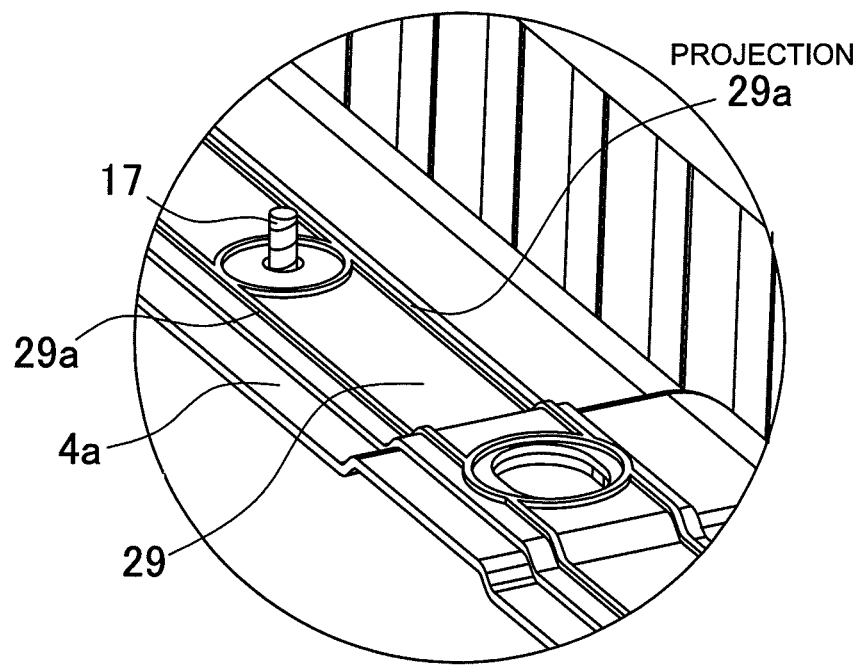
FIG. 13 is an enlarged perspective view of the gasket provided in the base-plate connecting region of the car power source apparatus shown in FIG. 5.
Figure 14:
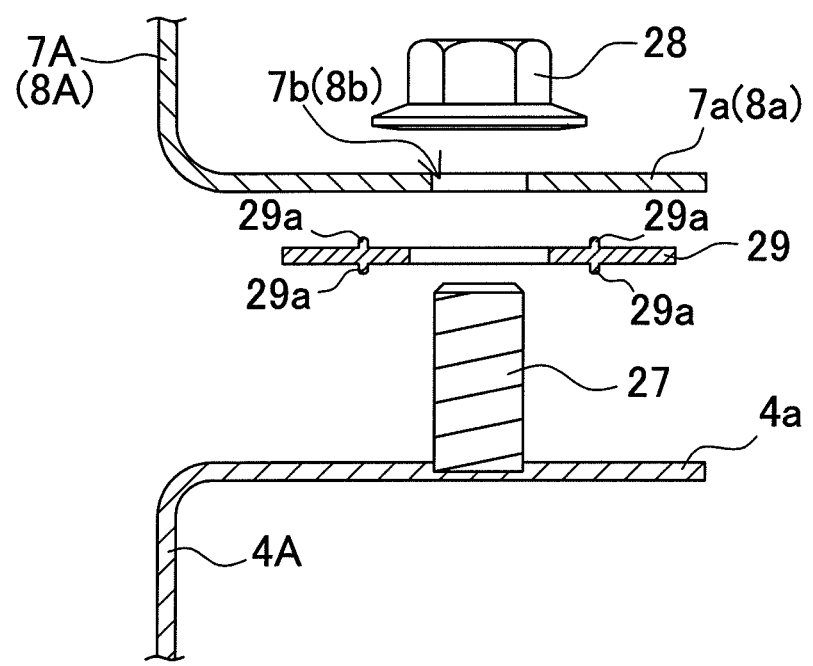
FIG. 14 is an exploded cross-sectional view showing the water-tight structure of the base-plate and cover-plate.

The external case 10 of FIGS. 4 and 5 has the base-plate 4 and cover-plate 5 joined in a water-tight structure. The external case 10 has gaskets 29 interposed in the outward bent connecting regions 4a, 7a, 8a provided on both sides of the base-plate 4 and the cover-plate 5 to join both sides of the base-plate 4 and cover-plate 5 in a water-tight structure. Further, the gasket 29 of FIGS. 13 and 14 has projections 29a that extend in the lengthwise direction, and those projections 29a are sandwiched between the base-plate 4 connecting regions 4a and the cover-plate 5 connecting regions 7a, 8a. This joins the top cover 7 and electronic component cover 8, which form the cover-plate 5, with the base-plate 4 in a water-tight structure. As shown in FIG. 4, the top cover 7 connecting region 7a and the electronic component cover 8 connecting region 8a are layered on top of the connecting regions 4a provided on both sides of the base-plate 4. As shown in FIG. 14, stud bolts 27 are mounted on the bottom layer connecting regions 4a, and through-holes 7b, 8b for stud bolt 27 insertion are provided through the top layer connecting regions 7a, 8a. The stud bolts 27 are inserted through the through-holes 7b, 8b, nuts 28 are threaded onto the stud bolts 27, and the gaskets 29 are sandwiched between the base-plate 4 connecting regions 4a and the cover-plate 5 connecting regions 7a, 8a to join the base-plate 4 and cover-plate 5 in a water-tight structure. However, the base-plate and cover-plate can also be joined in a water-tight configuration without providing stud bolts, but rather by fastening nuts onto bolts that pass through both connecting region layers.

Further, the external case 10 of FIG. 4 has set screws 30 that attach in a water-tight configuration to connect the cover-plate 5 to the battery blocks 2. An attachment section 9 is connected to the battery blocks 2 for attaching the top cover 5. The attachment section 9 is an attachment bar 31 that extends in the stacking direction of the batteries 1 that make up the battery blocks 2. The power source apparatus of FIGS. 5 and 6 has a plurality of battery blocks 2 arranged laterally and longitudinally and mounted in the external case 10. In the power source apparatus of FIGS. 5 and 6, two rows of battery blocks 2, which have two battery blocks 2 arranged in a straight-line in each row, are disposed on top of the base-plate 4 to hold a total of four battery blocks 2. The two rows of battery blocks 2 are disposed with separation to establish a cooling duct 20 between the two rows. The power source apparatus of FIG. 4 has the attachment bar 31 mounted between the two rows of battery blocks 2, and the top cover 7 is attached to that attachment bar 31.

Figure 15:
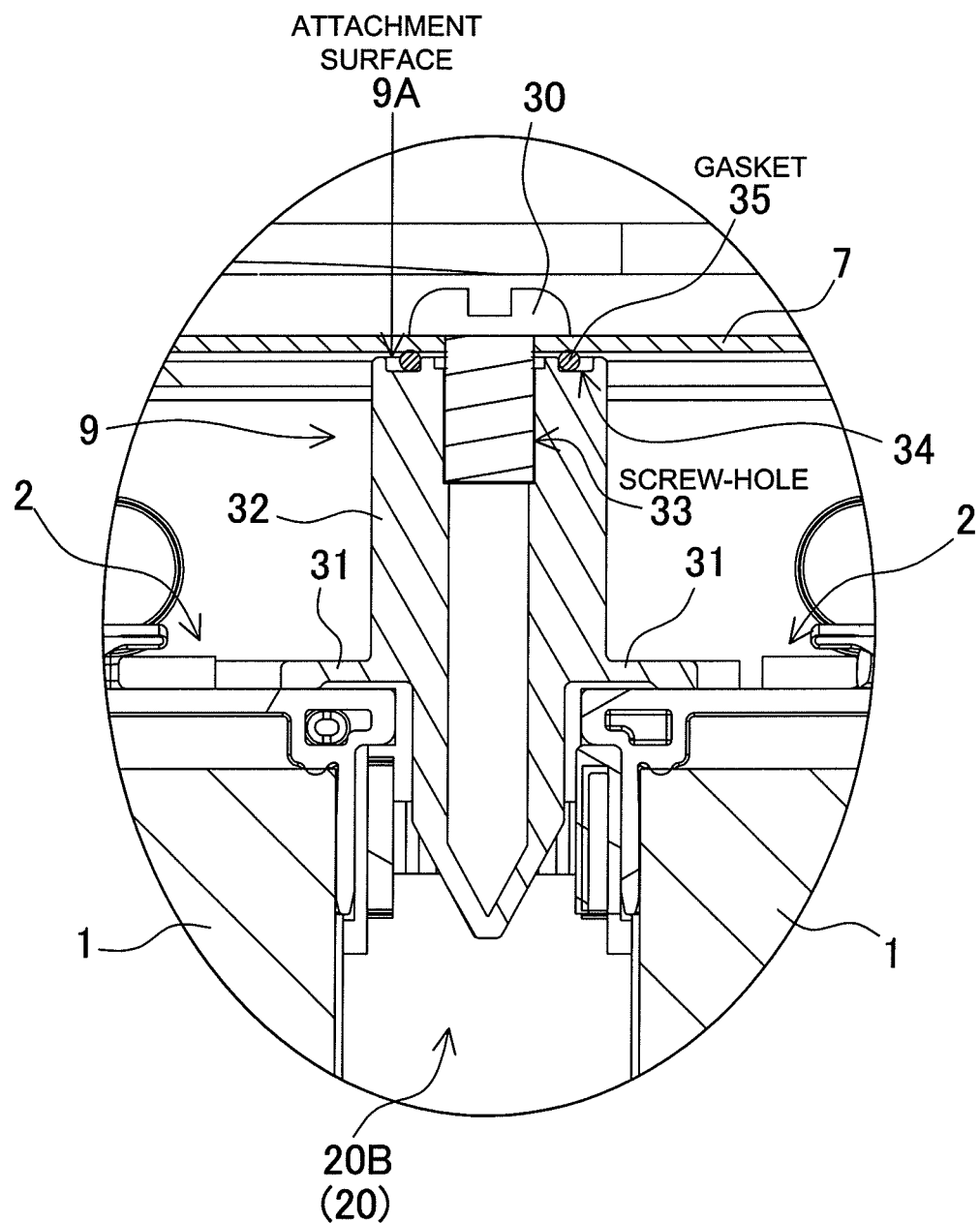
FIG. 15 is an enlarged cross-sectional view showing the water-tight structure of the top cover and the attachment region.

As shown in FIG. 6, the attachment bar 31 is connected to the endplates 22 that sandwich both ends of the batteries 1 that make up the battery blocks 2. The attachment bar 31 is provided with connecting bosses 32 that project towards the inside surface of the top cover 7. As shown in the enlarged cross-section of FIG. 15, the centers of the connecting bosses 32 are provided with screw-holes 33 to accept set screw 30 insertion. The screw-holes 33 have closed-off bottoms, and this achieves a configuration where water that passes through gaps between the set screws 30 and screw-holes 33 does not enter inside the external case 10. Further, the top of the attachment section 9, which has screw-holes 33 established along its center, is provided with attachment surfaces 9A that contact the inside surface of the top cover 7. The attachment surfaces 9A have ring-shaped gaskets 35 disposed around the outsides of the screw-hole 33 perimeters. To dispose the gaskets 35 in fixed positions, ring-grooves 34 are provided on the attachment surfaces 9A. The gaskets 35 are O-rings that fit in the ring-grooves 34. With the top cover 7 attached to the attachment section 9 via set screws 30, the gaskets 35 are sandwiched between the top cover 7 and the attachment surfaces 9A to attach the top cover 7 to the battery blocks 2 in a water-tight structure. Specifically, with the top cover 7 in surface contact with the attachment surfaces 9A, the gaskets 35, which are O-rings, are resiliently compressed to join the top cover 7 and attachment section 9 in a water-tight configuration. Further, with the top cover 7 attached to the attachment section 9 to attach it to the battery blocks 2, the inside surface of the top cover 7 is fixed on the exhaust ducts 11 disposed on top of the battery blocks 2.

The external case 10, which includes the base-plate 4 and top cover 7, is made wide enough to establish cooling ducts 20 on the outer sides of the battery blocks 2. The power source apparatus of FIG. 4 is provided with a cooling duct 20 at the center between the two rows of battery blocks 2, and is also provided with cooling ducts 20 on the outer sides of the battery blocks 2 between the battery blocks 2 and the side-wall sections 4A, 7A. The power source apparatus with a cooling duct 20 between the two rows of battery blocks 2 and a pair of cooling ducts 20 on the outer sides of the battery blocks 2 utilizes one as a cooling air supply duct and the other as a cooling air discharge duct. This cools the batteries 1 by forced ventilation through the separators 21 between the batteries 1.

The power source apparatus shown in the cross-section of FIG. 4 is provided with a side cooling duct 20A between the outer side (the right side in FIG. 4) of the battery blocks 2 and the top cover 7 side-wall section 7A. Outside this side cooling duct 20A on the outside of the external case 10 side-wall section 7A that forms the side cooling duct 20A, the electronic component cover 8 is provided to house the battery state detection section 3. This configuration establishes the side cooling duct 20A and side-wall section 7A between the electronic component compartment 13 that houses the battery state detection section 3 and the battery blocks 2. Consequently, in this configuration, battery block 2 heat does not heat the battery state detection section 3, and detrimental effects due to battery block 2 heating of the battery state detection section 3 are prevented.

The center cooling duct 20B established between the two rows of battery blocks 2 is closed-off at the top by the attachment bar 31 and closed-off at the bottom by the base-plate 4. The attachment bar 31 is a narrow metal plate that extends along the center cooling duct 20B formed between the two rows of battery blocks 2. The attachment bar 31 is attached to the battery blocks 2 on both sides to close-off the top of the center cooling duct 20B. The attachment bar 31 is attached to the top of the endplates 22 of the battery blocks 2 disposed on both sides via set screws. The attachment bar 31 is provided with protrusions 31A on both sides for attachment to the endplates 22, and through-holes are provided in the protrusions 31A to insert set screws. The attachment bar 31 of FIG. 6 is provided with protrusions 31A on both sides of both ends and on both sides in two locations at the mid-region. The attachment bar 31 is attached to the battery blocks 2 at the protrusions 31A.

The power source apparatus shown in FIG. 7 has the bottom of the battery blocks 2 mounted on the base-plate 4 via set screws 26. Set screws 26 passing through the base-plate 4 are screwed into the endplates 22 of the battery blocks 2. Further, although not illustrated, the power source apparatus has the top of the battery blocks attached to the side-plates via set screws. Set screws passing through the side-plates are screwed into the endplates to attach the battery blocks to the side-plates.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The present application is based on Application No. 2009-164264 filed in Japan on Jul. 10, 2009, the content of which is incorporated herein by reference.

What is claimed is:

1. A car power source apparatus comprising:
   a battery block having a plurality of connected batteries;
   a battery state detection section connected to the battery block;
   a base-plate that has the battery state detection section and the battery block mounted on top;
   a cover-plate that closes-off a top of the base-plate, establishes a battery holding region that holds the battery block between the base-plate and the cover-plate, and establishes an electronic component compartment that houses the battery state detection section between the base-plate and the cover-plate; and
   side-plates that close-off open regions between the cover-plate and the base-plate at opposite ends,
   wherein the cover-plate is provided with a top cover that establishes the battery holding region inside, and an electronic component cover that establishes the electronic component compartment inside,
   wherein the electronic component cover is layered on, and connected to the top cover of the cover-plate; stud bolts are fixed to the top cover, which is the lower layer, and through-holes are provided in the electronic component cover, which is the upper layer; the stud bolts are passed through the through-holes and nuts are threaded onto the stud bolts to attach the electronic component cover on top of the top cover, and wherein a gasket is interposed in a region where the electronic component cover and the top cover overlap at a location on the battery state detection section compartment-side of the stud bolts, and thereby achieving a water-tight structure at the connecting region of the top cover and the electronic component cover.

2. The car power source apparatus as cited in claim 1 wherein a cavity to hold the gasket is provided in either the top cover or the electronic component cover, and the gasket is disposed in the cavity.

3. The car power source apparatus as cited in claim 1 wherein both sides of the top cover in a lateral direction are attached to the base-plate to form the battery holding region inside; and the sides of the electronic component cover in the lateral direction are attached to the top cover and the base-plate, respectively to form the electronic component compartment inside.

4. The car power source apparatus as cited in claim 3 wherein the base-plate and the top cover are trough-shaped, and the electronic component cover is L-shaped; the base-plate and the top cover are provided with side-wall sections respectively on both sides, in the lateral direction, and the electronic component cover is provided with a side-wall section on one side in the lateral direction; the lateral width of the base-plate is wider than that of the top cover, the electronic component compartment that houses the battery state detection section is established between one of the side-wall sections of the top cover and one of the side-wall sections of the base-plate, and the electronic component cover closes-off the upper surface of the electronic component compartment.

5. The car power source apparatus as cited in claim 4 wherein one of the side-wall sections of the top cover is connected to one side-wall section of the base-plate; the other side-wall section of the top cover is attached to the floor of the base-plate and separates the electronic component compartment from the battery holding region that holds the battery block.

6. The car power source apparatus as cited in claim 1 wherein the cover-plate is attached to the side-plates in a water-tight structure by intervening gaskets; the gaskets are attached to the top surfaces of the side-plates and are sandwiched between the top surfaces of the side-plates and the inside surface of the cover-plate to make the connections between the cover-plate and the side-plates in water-tight structures.

7. A car power source apparatus comprising:
a battery block having a plurality of connected batteries;
a battery state detection section connected to the battery block;
a base-plate that has the battery state detection section and the battery block mounted on a top thereof;
a cover-plate that closes-off the top of the base-plate, establishes a battery holding region that holds the battery block between the base-plate and the cover-plate, and establishes an electronic component compartment that houses the battery state detection section between the base-plate and the cover-plate; and
side-plates that close-off open regions between the cover-plate and base-plate at opposite ends,
wherein the cover-plate is provided with a top cover that establishes the battery holding region inside, and an electronic component cover that establishes the electronic component compartment inside;
wherein the base-plate and the cover-plate are overlapped in a layered manner at opposite sides thereof in a lateral direction to provide connecting regions; and
wherein the car power source apparatus further comprises gaskets disposed in the connecting regions, respectively, the gaskets having projections that extend in a lengthwise direction, and the projections of the gaskets are sandwiched between the base-plate and the cover-plate at the connecting regions to make water-tight connections.

8. The car power source apparatus as cited in claim 7, wherein the electronic component cover is layered on, and connected to the top cover of the cover-plate; stud bolts are fixed to the top cover, which is the lower layer, and through-holes are provided in the electronic component cover, which is the upper layer; the stud bolts are passed through the through-holes and nuts are threaded onto the stud bolts to attach the electronic component cover on top of the top cover, wherein a gasket is interposed in a region where the electronic component cover and the top cover overlap at a location on the battery state detection section compartment-side of the stud bolts, and thereby achieving a water-tight structure at the connecting region of the top cover and the electronic component cover.

9. The car power source apparatus as cited in claim 7 wherein opposite sides of the top cover in the lateral direction are attached to the base-plate to form the battery holding region inside; and the sides of the electronic component cover in the lateral direction is attached to the top cover and the base-plate, respectively to form the electronic component compartment inside.

10. The car power source apparatus as cited in claim 9, wherein the base-plate and the top cover are trough-shaped, and the electronic component cover is L-shaped; the base-plate and the top cover are provided with side-wall sections, respectively on opposite sides in the lateral direction, and the electronic component cover is provided with a side-wall section on one side in the lateral direction; the lateral width of the base-plate is wider than that of the top cover, the electronic component compartment that houses the battery state detection section is established between one of the side-wall sections of the top cover and one of the side-wall sections of the base-plate, and the electronic component cover closes-off the upper surface of the electronic component compartment.

11. The car power source apparatus as cited in claim 10, wherein one side-wall section of the top cover is connected to one side-wall section of the base-plate; the other side-wall section of the top cover is attached to a floor of the base-plate and separates the electronic component compartment from the battery holding region that holds the battery block.

12. The car power source apparatus as cited in claim 7, wherein the cover-plate is attached to the side-plates in a water-tight structure by intervening gaskets; the gaskets are attached to top surfaces of the side-plates and are sandwiched between the top surfaces of the side-plates and an inside surface of the cover-plate to make the connections between the cover-plate and the side-plates water-tight structures.

13. A car power source apparatus comprising:
a battery block having a plurality of connected batteries;
a battery state detection section connected to the battery block;
a base-plate that has the battery state detection section and the battery block mounted on top;

a cover-plate that closes-off the top of the base-plate, establishes a battery holding region that holds the battery block between the base-plate and the cover-plate, and establishes an electronic component compartment that houses the battery state detection section between the base-plate and the cover-plate; and side-plates that close-off open regions between the cover-plate and base-plate at opposite ends, wherein the cover-plate is provided with a top cover that establishes the battery holding region inside, and an electronic component cover that establishes the electronic component compartment inside, wherein the battery block has an attachment section for attaching the top cover; the top cover is attached to the battery block attachment section via set screws that are inserted from outside of the top cover, pass through the top cover, and screw into the battery block attachment section, wherein the battery block attachment section defines screw-holes receiving the set screws, and the battery attachment section has attachment surfaces being contacted with an inside surface of the top cover; gaskets are disposed around the outsides of the screw-hole perimeters, and the gaskets are sandwiched between the top cover and the attachment surfaces to attach the top cover to the battery block in a water-tight structure, wherein the battery block further comprises endplates that sandwich the batteries therebetween in a stacked state, and the battery block attachment section constitutes an attachment bar extended lengthwise in the battery stacking direction and being attached to the endplates, the attachment bar has connecting bosses projected towards the inside surface of the top cover, and screw-holes established inside the connecting bosses, wherein the car power source apparatus further comprises:
a plurality of the battery blocks, the battery blocks being disposed in two rows on the base-plate, and
a cooling duct being established between the two rows of the battery blocks, and wherein a top of the cooling duct is closed-off by the attachment bar as the attachment section.

14. A car power source apparatus comprising:
a battery block having a plurality of batteries;
a battery state detection section connected to the battery block;
a base-plate that has the battery state detection section and the battery block mounted on a top thereof;
a cover-plate that closes-off the top of the base-plate, establishes a battery holding region that holds the battery block between the base-plate and the cover-plate, and establishes an electronic component compartment that houses the battery state detection section between the base-plate and the cover-plate; and
side-plates that close-off open regions between the cover-plate and base-plate at opposite ends,
wherein the cover-plate is provided with a top cover that establishes the battery holding region inside, and an electronic component cover that establishes the electronic component compartment inside;
wherein the battery block has an attachment section for attaching the top cover; the top cover is attached to the battery block attachment section via set screws that are inserted from the outside of the top cover, pass through the top cover, and screw into the battery block attachment section, wherein the battery block attachment section has screw-holes that are configured to receive the set screws, and the battery block attachment section has attachment surfaces being contacted with an inside surface of the top cover; gaskets are disposed around outsides of the screw-hole perimeters, and the gaskets are sandwiched between the top cover and the attachment surfaces to attach the top cover to the battery block in a water-tight structure, wherein opposite sides of the top cover in a lateral direction are attached to the base-plate to form the battery holding region inside; and each side of the electronic component cover in the lateral direction is attached to the top cover and the base-plate, respectively to form the electronic component compartment inside.

15. The car power source apparatus as cited in claim 14, wherein the base-plate and the top cover are trough-shaped, and the electronic component cover is L-shaped; each of the base-plate and top cover are provided with side-wall sections on both sides in the lateral direction and the electronic component cover is provided with a side-wall section on one side in the lateral direction; the lateral width of the base-plate is wider than that of the top cover, the electronic component compartment that houses the battery state detection section is established between one of the side-wall sections of the top cover and one of the side-wall sections of the base-plate, and the electronic component cover closes-off an upper surface of the electronic component compartment.

16. The car power source apparatus as cited in claim 15, wherein one side-wall section of the top cover is connected to one side-wall section of the base-plate; the other side-wall section of the top cover is attached to a floor of the base-plate and separates the electronic component compartment from the battery holding region that holds the battery block.

17. The car power source apparatus as cited in claim 13, wherein the cover-plate is attached to the side-plates by intervening gaskets; the gaskets are attached to top surfaces of the side-plates and are sandwiched between the top surfaces of the side-plates and the inside surface of the cover-plate to make the connections between the cover-plate and side-plates water-tight.

18. The car power source apparatus as cited in claim 7, wherein the top cover is configured to meet the base-plate, and the electronic component cover is configured to also meet the base plate at opposite sides of the base-plate in the lateral direction to form the connecting regions, and the projections of the gaskets are sandwiched at both of the connecting regions.

19. The car power source apparatus as cited in claim 6, wherein the cover-plate has end edge-covers at opposite ends of the cover-plate, the end edge-covers being extended downwardly from top surfaces of the side-plates along outer surfaces of the side-plates so that the end edge-covers of the cover-plate form water-tight regions between the cover-plate and the side-plates.

* * * * *